United States Patent [19]

Itoh et al.

[11] Patent Number: 4,808,392

[45] Date of Patent: Feb. 28, 1989

[54] PROCESS FOR PRODUCING SILANES

[75] Inventors: Masayoshi Itoh; Hiroharu Miyagawa, both of Yokohama; Masami Murakami, Zushi; Tomohiro Abe, Yokosuka; Kaoru Inoue, Yokohama; Keiichi Ikeda, Chigasaki, all of Japan

[73] Assignee: Mitsui Toatsu Chemicals, Inc., Tokyo, Japan

[21] Appl. No.: 68,759

[22] Filed: Jun. 29, 1987

Related U.S. Application Data

[63] Continuation-in-part of Ser. No. 901,771, Aug. 29, 1986, abandoned.

[30] Foreign Application Priority Data

| Sep. 3, 1985 | [JP] | Japan | 60-193250 |
| Sep. 3, 1985 | [JP] | Japan | 60-193251 |
| Sep. 3, 1985 | [JP] | Japan | 60-193252 |
| Sep. 3, 1985 | [JP] | Japan | 60-193253 |
| Sep. 3, 1985 | [JP] | Japan | 60-193254 |

[51] Int. Cl.$^4$ ............................................. C01B 33/04
[52] U.S. Cl. ................................................. 423/347
[58] Field of Search .................................... 423/347

[56] References Cited

U.S. PATENT DOCUMENTS

4,610,859  9/1986  Miyagawa et al. .................. 423/434

*Primary Examiner*—Paul F. Shaver
*Attorney, Agent, or Firm*—Fisher, Christen & Sabol

[57] ABSTRACT

A process for producing silanes represented by the general formula $SI_nH_{2n+2}$ wherein n is 1 or 2, which comprises (a) preparing a silicon-magnesium alloy containing at least one element selected from the goup consisting of Li, Na, K, Ca, Ba, Ti, Zr, Nb, Cr, Mo, Mn, Fe, Co, Ni, Pd, Cu, Ag, Zn, Cd, Al, Sn, Pb, Bi, Se, S and C as a third component element; (b) reacting the alloy containing the third component element with an acid in an ammonia solvent; and (c) thus, varying the ratio of $Si_2H_6$ formed to $SiH_4$ formed.

4 Claims, 1 Drawing Sheet

PROCESS FOR PRODUCING SILANES

This application is a continuation-in-part, of application Ser. No. 901,771, filed Aug. 29, 1986, now abandoned.

BACKGROUND OF THE INVENTION

1. Field of the Invention

This invention relates to a process for producing silanes represented by the general formula $Si_nH_{2n+2}$ wherein n is 1 or 2 by reacting an alloy containing silicon with an acid.

2. Description of the Prior Art

With a tremendous advance in the electronics industry in recent years, there has been a rapidly increasing demand for silicon for semiconductors such as polycrystalline silicon or amorphous silicon. Silanes have recently gained increasing importance as a material for production of such silicon for semiconductors. In particular, silane ($SiH_4$) and disilane ($Si_2H_6$) are expected to have a greatly increased demand in future as a material for solar cell semiconductors, electrophotographic materials, thin-film transistors, etc.

Particularly, $Si_2H_6$ has a much higher deposition rate than $SiH_4$ in the formation of an amorphous silicon film by chemical vapor deposition (CVD) [for example, Appl. Phys. Lett., 37, 725 (1980)], and has recently been rapidly studied for new uses as a new starting gas for formation of semiconductor films.

Some methods illustrated below have previously been known for the production of silanes.

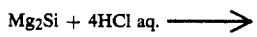 (1)

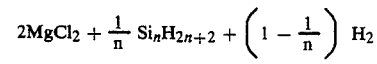

(wherein n is an integer of at least 1)

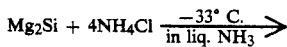 (2)

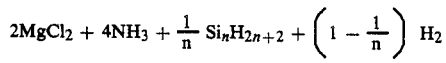

(wherein n 1 or 2)

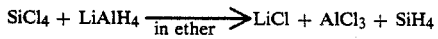 (3)

 (4)

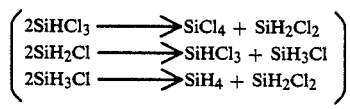

Of these, the methods (1) and (2) involving reaction of a silicon alloy, particularly magnesium silicide, with an acid have long been known as most easily practicable methods. The methods (1) and (2) have the advantage that they do not require expensive reducing agents as does the reaction of the method (3), and they do not require reaction under elevated pressures as does the reaction of the method (4) but can be carried out substantially at room temperature and atmospheric pressure. For example, disilane ($Si_2H_6$) can be obtained by reducing expensive hexachlorodisilane ($Si_2Cl_6$) with a metal hydride. But it can be very easily obtained by the method (1) or (2), particularly the method (1). In the method (1) in which the reaction is carried out in a water solvent, formation of a silicon compound having a siloxane linkage as a by-product cannot be avoided. Consequently, the conversion of silicon in the silicon alloy to silanes (to be referred to as the yield based on silicon atom) is low, and the ratio of $SiH_4$ to $Si_2H_6$ formed is invariable the total yield of $SiH_4$ and $Si_2H_6$ is about 30%; the $SiH_4/Si_2H_6$ mole ratio is about 2 (based on Si atoms); see, for example, Journal of the Chemical Society, 1131 (1946)]. The method (1) also has the disadvantage that since a viscous black solid accumulates in the reactor as the reaction proceeds, its adhesion to the reactor wall reduces thermal conduction, and makes the stirring of the reaction mixture poor. Furthermore, according to the method (1), self-combustible gas is handled in a strongly corrosive acidic aqueous solution. Hence, a technically high level of measures for safety is required.

The present inventors made extensive efforts in order to solve this problem, and previously found that the yields of $SiH_4$ and $Si_2H_6$ are increased greatly by a method involving the copresence of an organic solvent such as an ether or a hydrocarbon in the reaction system, or a method by which by-product higher silanes soluble in the aforesaid organic solvent are converted to lower $SiH_4$ and $Si_2H_6$ (the total yields of $SiH_4$ and $Si_2H_6$ is 60 to 70%, for example, Japanese Laid-Open Patent Publications Nos. 141614/1985, 141615/1985, 255613/1985, and 251114/1985). However, even by these methods, it is difficult to vary the ratio of $SiH_4$ to $Si_2H_6$ as desired, and the $SiH_6/Si_2H_6$ mole ratio is within a narrow range of about 1 to 2 (Si atom base).

The method (2) is a highly safe process without a risk of corrosion as in the method (1), and the yield of $SiH_4$ is 70 to 80%. The yield of $Si_2H_6$, however, is very low and is 5% at most (for example, Journal of American Chemical Society, vol., 57, 1349 (1935); Japanese Patent Publication No. 14708/1967; and Japanese Patent Publication No. 22918/1973).

Until very recently, however, only $SiH_4$ had been substantially used in the silicon semiconductor industry, and the main purpose had been to produce $SiH_4$. Accordingly, no work on increasing of the yield of $Si_2H_6$ has previously been done, and no method has previously been known for varying the ratio of $SiH_4$ to $Si_2H_6$ as desired.

It has recently been made clear that in the formation of amorphous silicon film by, for example, CVD, disilane has a much higher deposition rate than monosilane, and disilane has been rapidly studied for utility as a new material gas for formation of semiconductor films which supersedes monosilane.

Accordingly, it is very desirable to use monosilane or disilane selectively as a starting gas in the production of silicon for semiconductors so that they exhibit their inherent characteristics as much as possible.

SUMMARY OF THE INVENTION

It is an object of this invention to provide a process which can give $Si_2H_6$ in a high yield.

Another object of this invention is to provide a process for producing silanes by which the ratio of $SiH_4$ to $Si_2H_6$ can be greatly varied.

Still another object of this invention is to provide a process for producing silanes in which the total yield of SiH$_4$ and Si$_2$H$_6$ can be maintained at a nearly constant high level even when the ratio of SiH$_4$ to Si$_2$H$_6$ formed is varied greatly.

Further objects of this invention will become apparent from the following description.

According to this invention, there is provided a process for producing silanes represented by the general formula Si$_n$H$_{2n+2}$ wherein n is 1 or 2, which comprises (a) preparing a silicon-magnesium alloy containing at least one element selected from the group consisting of Li, Na, K, Ca, Ba, Ti, Zr, Nb, Cr, Mo, Mn, Fe, Co, Ni, Pd, Cu, Ag, Zn, Cd, Al, Sn, Pb, Bi, Se, S and C as a third component element, (b) reacting the alloy containing the third component element with an acid in an ammonia solvent, and (c) thus, varying the ratio of Si$_2$H$_6$ formed to SiH$_4$ formed.

DETAILED DESCRIPTION OF THE INVENTION

Figure 1:
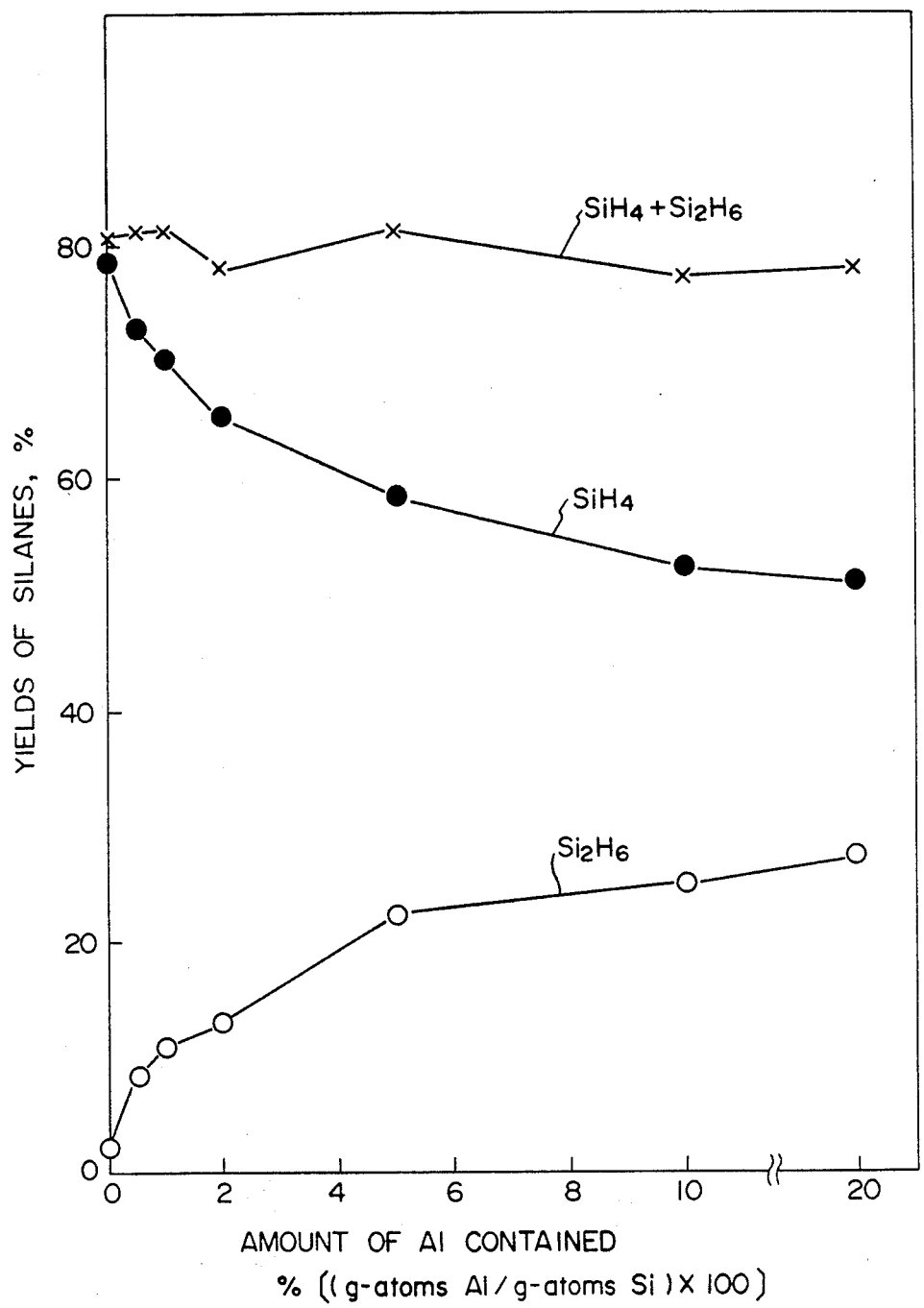
FIG. 1 is a graph showing the relation between the yields of SiH$_4$ and Si$_2$H$_6$ and the amount of Al as a third component in a silicon-magnesium alloy.

The silicon-magnesium alloy used in the process of this invention (to be simply referred to as the alloy) has a chemical composition with a Mg/Si gram-atom ratio of from 0.1 to 10, preferably from 1 to 3, more preferably 2 (Mg$_2$Si). There is no particular restriction on the particle size of the alloy, but it is preferably as small as possible. For economical or handling reasons, it is preferably within the range of about 20 to about 300 mesh.

The alloy is easily available on the market, and can be used as such. If desired, it may be produced by a known method. Specifically, it may be obtained easily by mixing silicon powder with magnesium, and calcining the mixture in an atmosphere of hydrogen or an inert gas such as argon or helium at a temperature of about 450° to 1200° C., preferably 500° to 1000° C., for 10 minutes to 10 hours, preferably about 1 to 4 hours.

Basically, according to the present invention, the alloy is reacted with an acid in an ammonia solvent. Desirably, ammonia is substantially anhydrous. The acid may be any material which acts on the alloy as an acid in ammonia, and may be any of various inorganic and organic acids. Preferred examples include ammonium chloride, ammonium bromide, ammonium rhodanate, ammonium acetate, ammonium sulfamate, and hydrazyl chloride. Ammonium chloride is most preferred from the standpoint of economy and the yield of Si$_2$H$_6$.

The greatest feature of this invention is that the alloy contains a specific third component element and then reacts with the acid. The third component element is selected from the group consisting of Li, Na, K, Ca, Ba, Ti, Zr, Nb, Cr, Mo, Mn, Fe, Co, Ni, Pd, Cu, Ag, Zn, Cd, Al, Sn, Pb, Bi, Se, S and C. Of these, Ca, Fe, Ni, Pd, Cu, Ag, Al, Sn, Pb, Bi and Zr are preferred from the standpoint of the yield of Si$_2$H$_6$ and of the relatively low price of these elements.

Various methods can be used to prepare a silicon-magnesium alloy containing these third component elements, but the most preferred one is to prepare an alloy composed of silicon, magnesium and the third component element. Specifically, it can be obtained, for example, by (1) calcining a mixture composed of silicon, magnesium and the third component element in hydrogn or an inert gas such as argon or helium; or (2) calcining in the same manner (i) magnesium silicide and the third component element, or (ii) an alloy (or compound) composed of silicon and the third component (may also be a silicon material containing the third component sepcified in this invention in the desired amount) and magnesium, or (iii) an alloy (or compound) composed of magnesium and the third component and silicon. These alloys are obtained not only from elements of the individual components, but also from a compound with other elements. For example, there can be employed a method in which the oxides of the respective elements are used as starting materials, and subjected simultaneously to a deoxygenation reaction and an alloyproducing reaction in an atmosphere of a reducing gas. The temperature at which the alloy containing the third component is produced may be varied depending upon the third component element, but is generally 100° to 1500° C., preferably 200° to 1000° C. The calcination time may be varied depending upon the type of the third component element, but is generally 10 minutes to 30 hours, preferably 30 minutes to 10 hours. A mixture obtained by simply mixing magnesium silicide with the third component elment physically at room temperature may be used as the alloy, but in this case, the effect of the invention is small.

The amount of the third component element is expressed on the basis of silicon in the silicon alloy. If the amount of the third component element contained is expressed as (the gram-atoms of the third component element contained/gram-atoms of silicon) x 100, it is at least 0.1% to 100%, preferably 0.2% to 50%, more preferably 0.5% to 20%, especially preferably 0.5% to 10%. If the amount of the third component element is smaller than the specified limit, the effect is small. On the other hand, if the amount of the third component element is increased beyond the specified limit, no further outstanding effect such as the increase of the yield of Si$_2$H$_6$ can be obtained.

Two or more third component elements may be used in this invention. Elements other than silicon, magnesium and the third component elements may be included in the alloy used in this invention if they are in small amounts which do not impair the objects of this invention.

There is no particular restriction on the mode of reaction of the alloy containing the third component element with the acid, and various methods ordinarily practiced may be used. For example, there may be used a method in which ammonium is added to a mixture of the alloy and ammonium chloride, or a method in which the alloy is added to ammonia having ammonium chloride dissolved therein. The ratio of the acid to the alloy is desirably the stoichiometric ratio from the economical standpoint. For example, in the case of Mg$_2$Si alloy, the stoichiometric ratio is 4.0 [=(H+/Mg$_2$Si) gram mole ratio). Preferably, the amount of the acid is excessive in order to obtain good yields of silanes. The above mole ratio is at least 4.0, preferably at least 4.4. Even if the acid is used in too excessive an amount, the yield of silanes does not change too much, and moreover, it is not economical. Usually, the mole ratio is not more than 40, preferably not more than 20. It is preferable to take into account the acid consumption by the third component.

The reaction temperature is preferably −50° to 100° C., and can be determined as desired according to the reaction pressure (atmospheric, elevated, or reduced). Most preferably, the reaction is carried out under atmospheric pressure under reflux of ammonia (about −33° C.). The $SiH_4$ and $Si_2H_6$ obtained may be easily separated by ordinary distillation.

Incidentally, Japanese Laid-Open Patent Publication No. 98399/1974 and EP 146456 disclose a method of reacting the silicon alloy with the acid in a water solvent wherein a silicon alloy composed of three components is used as the alloy. In the first-mentioned document, zinc is added to magnesium silicide, and the mixture is hydrolyzed in an acidic aqueous solution whereby the ratio of $Si_2H_6$ is decreased and $SiH_4$ is obtained in a high yield. By the addition of zinc, the formation of $Si_2H_6$ decreases and becomes nearly zero. According to the second-mentioned document, a ternary silicon alloy (e.g., Al-Ca-Si) is hydrolyzed with an acid. The yield of silanes (the total yield of $SiH_4$ and $Si_2H_6$) is as low as about 30% (yield of $SiH_4$ about 20%; yield of $Si_2H_6$ about 10%).

The present invention relating to the process for producing silanes by the reaction of an alloy composed of silicon and magnesium with an acid is expected to be easily applicable to the production of other metal hydrides by the reaction of alloys of magnesium with acids, specifically the production of germanium hydrides, and phosphorus hydrides.

DESCRIPTION OF THE PREFERRED EMBODIMENTS

The following examples illustrate the present invention more specifically.

EXAMPLE 1

A mixture composed of 4.21 g of silicon powder (purity more than 99.9%, particle size smaller than 200 mesh; a product of Mitsuwa Chemical Co., Ltd.), 7.29 g of magnesium powder (purity at least 99.9%, a product of Wako Pure Chemicals, Co., Ltd.), and 0.62 g (corresponding to 2 mole % of Si) of lead powder (particle size smaller than 200 mesh), special reagent grade, a product of Wako Pure Chemicals, Co., Ltd.) was placed in a porcelain crucible, and calcined in an argon-hydrogen mixed gas (hydrogen content 3% by volume) at 650° C. for 4 hours to form a silicon alloy. After the calcination, the alloy was pulverized to a size smaller than 80 mesh by a mortar.

Ammonium chloride powder (9.7 g) and 3.0 g (37.0 mmoles as Si) of the above alloy were well mixed and fed into a 300 ml cylindrical separable flask. A refluxing device cooled at the dry ice temperature was fitted to the reactor, and ammonia was fed in a hydrogen atomosphere at a fixed rate of 1.0 g/min. for 30 minutes. The reaction was carried out while refluxing ammonia (−33° C.). After the feeding of ammonia, the reaction mixture was maintained in the same state for 30 minutes. The resulting silane gases were separated from ammonia by washing with hydrochloric acid, and collected in a trap cooled at the liquid nitrogen temperature. After the experiment, the amounts of $SiH_4$ and $Si_2H_6$ in the colleced gases were determined by gas chromatography.

The amounts of $SiH_4$ and $Si_2H_6$ were 26.1 millimoles, and 1.8 millimoles, respectively. The amounts of $SiH_4$ and $Si_2H_6$ corresponded to 80.3% of silicon in the magnesium silicide used in the reaction (silicon atom base), and the $SiH_4/Si_2H_6$ mole ratio was 6.21. Under these conditions, $Si_3H_8$ higher silanes were hardly formed.

EXAMPLES 2-15

Experiment was repeated except that the silicon alloy was produced by using 0.12 g of calcium (purity 98.5%; a product of Pure Chemical Co., Ltd.), 0.17 g of iron powder (a product of Wako Pure Chemical Co., Ltd.), 0.18 g of nickel powder (particle size smaller than 100 mesh, a product of Wako Pure Chemical Co., Ltd.), 0.32 g of palladium black (a product of Kojima Chemical Co., Ltd.), 0.19 g of copper powder (a product of Wako Pure Chemical Co., Ltd.), 0.32 g of silver powder (a product of Wako Pure Chemical Co., Ltd.), 0.081 g of aluminum powder (particle size 250 mesh, a product of Pure Chemical Co., Ltd.), 0.36 g of tin powder (smaller than 200 mesh, a product of Wako Pure Chemical Co., Ltd.), 0.63 g of bismuth powder (purity 99.99%, particle size smaller than 200 mesh; a product of Soekawa Rikagaku Co., Ltd.), 0.27 g of zirconium powder (purity 98%, a product of Soekawa Rikagaku Co., Ltd.), 0.16 g of manganese powder (special reagent grade, particle size smaller than 200 mesh; a product of Wako Pure Chemical Co., Ltd.), 0.069 g of sodium (a product of Wako Pure Chemical Co., Ltd.), 0.14 g of titanium powder (purity 98%, a product of Wako Pure Chemical Co., Ltd.) or 0.16 g of chromium powder (particle size 250 mesh, a product of Kanto Chemical Co., Ltd.) as the third component instead of the lead powder in EXAMPLE 1.

The results are shown in Table 1.

EXAMPLES 16-27

Examples 1 to 12 were each repeated except that the temperature at which the alloy was produced was changed to 950° C.

The resutls are shown in Table 1.

EXAMPLES 28-32

Example 8 was repeated except that the amount of aluminum contained as the third component in the production of the silicon alloy was changed to 0.81 g (20% of Si), 0.41 g (10% of Si), 0.203 g (5% of Si), 0.041 g (1% of Si), and 0.0203 g (0.5% of Si) on the Si gram-atom basis.

The results are shown in Table 1 and FIG. 1. It can be seen from FIG. 1 that by increasing the amount of aluminum, the yield of $Si_2H_6$ is increased, $SiH_4/Si_2H_6$ mole ratio can be varied, and the total yield of $SiH_4$ and $Si_2H_6$ is nearly at a constant high level.

EXAMPLE 33

An alloy (1.68 g) composed of silicon and aluminum (weight composition: Si=0.95, Al=0.05) was first produced, and 2.61 g of silicon and 7.29 g of magnesium were added. The mixture was calcined at 650° C. for 4 hours. Example 1 was repeated except that the resulting alloy was used instead of the alloy used in Example 1.

The results are shown in Table 1.

EXAMPLE 34

Silicon (4.21 g) and 7.29 g of magnesium powder were calcined at 650° C. for 4 hours, and the resulting magnesium silicide was mixed with 0.081 g of aluminum as the third component. The mixture was then calcined at 650° C. for 4 hours. Example 1 was repeated except that the resulting alloy was used instead of the alloy used in Example 1.

The results are shown in Table 1.

EXAMPLE 35

Example 1 was repeated except that an alloy obtained by calcining a mixture of 4.21 g of silicon, 7.29 g of magnesium and 0.62 g of lead and 0.081 g of aluminum as the third components at 650° C. for 4 hours was used as the alloy.

The results are shown in Table 1.

refluxing of ammonia. Otherwise, the same procedure as in Example 1 was repeated.

The results are shown in Table 1.

COMPARATIVE EXAMPLE 3

Example 36 was repeated except that an alloy obtained by calcining silicon and magnesium at 650° C. for 4 hours without using bismuth as the third element was used as the alloy.

The results are shown in Table 1.

TABLE 1

| | Third component element | | | | | | |
|---|---|---|---|---|---|---|---|
| Example | element | $\frac{\text{element (g-atoms)}}{\text{Si (g-atoms)}} \times 100$ (%) | Alloy-producing temperature (°C.) | Moles of silanes formed SiH$_4$ | Si$_2$H$_6$ | Total yield of silanes (%) (*1) | $\left(\frac{\text{SiH}_4}{\text{Si}_2\text{H}_6}\right)$ mole ratio (*2) |
| 1 | Pb | 2 | 650 | 26.1 | 1.8 | 80.3 | 6.21 |
| 2 | Ca | " | " | 27.2 | 1.2 | 80.0 | 11.33 |
| 3 | Fe | " | " | 26.5 | 1.2 | 78.1 | 11.04 |
| 4 | Ni | " | " | 23.0 | 3.1 | 78.9 | 3.71 |
| 5 | Pd | " | " | 19.7 | 4.3 | 76.5 | 2.29 |
| 6 | Cu | " | " | 22.4 | 3.1 | 77.3 | 3.61 |
| 7 | Ag | " | " | 21.1 | 4.0 | 78.6 | 2.64 |
| 8 | Al | " | " | 24.1 | 2.4 | 78.1 | 5.02 |
| 9 | Sn | " | " | 24.8 | 2.1 | 78.4 | 5.90 |
| 10 | Bi | " | " | 21.4 | 3.7 | 77.8 | 2.89 |
| 11 | Zr | " | " | 28.7 | 0.6 | 80.8 | 23.92 |
| 12 | Mn | " | " | 25.7 | 1.5 | 77.6 | 8.57 |
| 13 | Na | " | " | 26.5 | 1.1 | 77.6 | 12.0 |
| 14 | Ti | " | " | 28.3 | 0.7 | 80.3 | 20.2 |
| 15 | Cr | " | " | 26.8 | 1.3 | 79.5 | 10.3 |
| 16 | Pb | 2 | 950 | 25.5 | 1.6 | 77.6 | 7.97 |
| 17 | Ca | " | " | 23.1 | 3.0 | 78.6 | 3.85 |
| 18 | Fe | " | " | 24.1 | 2.0 | 75.9 | 6.03 |
| 19 | Ni | " | " | 20.3 | 3.4 | 73.7 | 2.99 |
| 20 | Pd | " | " | 19.4 | 4.1 | 74.6 | 2.37 |
| 21 | Cu | " | " | 19.9 | 3.4 | 72.2 | 2.93 |
| 22 | Ag | " | " | 20.0 | 4.1 | 76.2 | 2.44 |
| 23 | Al | " | " | 23.3 | 3.1 | 79.7 | 3.76 |
| 24 | Sn | " | " | 23.2 | 2.2 | 74.6 | 5.27 |
| 25 | Bi | " | " | 20.5 | 3.5 | 74.3 | 2.93 |
| 26 | Zr | " | " | 24.0 | 2.0 | 75.7 | 6.00 |
| 27 | Mn | " | " | 21.1 | 3.0 | 73.2 | 3.52 |
| 28 | Al | 20 | 650 | 18.9 | 5.0 | 78.1 | 1.74 |
| 29 | " | 10 | " | 19.4 | 4.6 | 77.3 | 1.97 |
| 30 | " | 5 | " | 21.7 | 4.2 | 81.1 | 2.58 |
| 31 | Al | 1 | 650 | 26.1 | 2.0 | 81.5 | 6.53 |
| 32 | " | 0.5 | " | 27.0 | 1.6 | 81.6 | 8.44 |
| 33 | " | 2 | " | 23.5 | 2.8 | 78.6 | 4.20 |
| 34 | " | " | " | 26.2 | 1.5 | 78.9 | 8.73 |
| 35 | Al Pb | " | " | 22.9 | 3.3 | 79.7 | 3.45 |
| 36 | Bi | " | " | 23.1 | 3.2 | 79.7 | 3.61 |
| Comparative 1 | — | — | " | 29.1 | 0.4 | 80.8 | 36.38 |
| Comparative 2 | — | — | 950 | 27.2 | 0.9 | 78.4 | 15.11 |
| Comparative 3 | — | — | 650 | 30.4 | 0.2 | 83.2 | 76.00 |

(*1): Percentage of the formed silanes (SiH$_4$ + Si$_2$H$_6$) based on Mg$_2$Si charged (Si g-atom base)
(*2): Si atom base

COMPARATIVE EXAMPLES 1-2

Example 1 was repeated except that without adding lead as the third component element, silicon and magnesium were calcined at 650° C. and 950° C., respectively.

The results are shown in Table 1.

EXAMPLE 36

A 300 ml cylindrical separable flask was charged with 50 g of ammonia, and 9.7 g of ammonium chloride was dissolved in it. The bismuth-containing alloy used in Example 10 was added at a fixed rate for 30 minutes with stirring. The amount of the alloy was 37.0 millimoles, as Si, and the reaction was carried out under

INDUSTRIAL APPLICABILITY

According to the process of this invention, the yield of Si$_2$H$_6$ can be greatly increased without decreasing the total yield of SiH$_4$ and Si$_2$H$_6$ by adding a specific third element in an alloy comprising silicon and magnesium in the industrial production of silanes by the reaction of the alloy with an acid. The economy of the process is greatly improved since by this process, the ratio of SiH$_4$ and Si$_2$H$_6$ can be controlled as desired.

In the production of silicon for semiconductors, SiH$_4$ is desired in some case, and in another case, Si$_2$H$_6$ is more desired. According to the present invention, the ratio of these silanes can be varied as required, and the significance of the process in industry is very great.

What is claimed is:

1. Process for producing silanes represented by the general formula $Si_nH_{2n+2}$ wherein n is 1 or 2, which comprises:
   (a) preparing a silicon-magnesium alloy containing at least one element selected from the group consisting of Li, Na, K, Ca, Ba, Ti, Zr, Nb, Cr, Mo, Mn, Fe, Co, Ni, Pd, Cu, Ag, Zn, Cd, Al, Sn, Pb, Bi, Se, S and C, as a third component, said third component element being contained in an amount of at least 0.2 percent on the thr gram-atom basis of silicon;
   (b) reacting the alloy containing the third component element with an acid in an ammonia solvent; and
   (c) thus, varying the ratio of $Si_2H_6$ formed to $SiH_4$ formed.

2. The process of claim 1 wherein the third component element is contained in the alloy in a larger amount, thereby increasing the yield of $Si_2H_6$.

3. The process of claim 2 wherein the acid is ammonium chloride or ammonium bromide.

4. The process of claim 1 wherein the acid is ammonium chloride or ammonium bromide.

* * * * *